United States Patent
Louis et al.

(10) Patent No.: US 12,018,124 B2
(45) Date of Patent: Jun. 25, 2024

(54) PEEK-PEoEK COPOLYMER POWDER AND METHOD OF PREPARING THE POWDER

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 83 days.

(21) Appl. No.: 17/618,903

(22) PCT Filed: Jun. 11, 2020

(86) PCT No.: PCT/EP2020/066177
§ 371 (c)(1),
(2) Date: Dec. 14, 2021

(87) PCT Pub. No.: WO2021/001132
PCT Pub. Date: Jan. 7, 2021

(65) Prior Publication Data
US 2022/0380536 A1 Dec. 1, 2022

Related U.S. Application Data

(60) Provisional application No. 62/869,099, filed on Jul. 1, 2019.

(30) Foreign Application Priority Data

Aug. 20, 2019 (EP) .................................... 19192604

(51) Int. Cl.
| | |
|---|---|
| C08G 65/46 | (2006.01) |
| B29C 64/153 | (2017.01) |
| B29K 71/00 | (2006.01) |
| B33Y 10/00 | (2015.01) |
| B33Y 70/00 | (2020.01) |
| C08G 65/40 | (2006.01) |
| C08J 3/12 | (2006.01) |

(52) U.S. Cl.
CPC ............ *C08G 65/46* (2013.01); *B29C 64/153* (2017.08); *B33Y 10/00* (2014.12); *B33Y 70/00* (2014.12); *C08G 65/4012* (2013.01); *C08J 3/12* (2013.01); B29K 2071/00 (2013.01); C08J 2371/10 (2013.01)

(58) Field of Classification Search
CPC ....... C07C 45/45; C07C 45/455; C07C 45/46; C07C 45/48; C07C 45/64; B32B 27/285; B32B 27/288; B32B 15/08; B32B 15/089; B33Y 70/00; B33Y 70/10; B29C 64/00; B29C 64/106; B29C 64/112; B29C 64/124; B29C 64/129; B29C 64/135; B29C 64/141; B29C 64/147; B29C 64/153; B29C 64/159; B29C 64/165
See application file for complete search history.

(56) References Cited

U.S. PATENT DOCUMENTS

| | | | |
|---|---|---|---|
| 5,250,738 A | 10/1993 | Hackenbruch et al. | |
| 5,300,693 A | 4/1994 | Gilb et al. | |
| 9,133,111 B2 | 8/2015 | Louis et al. | |
| 10,988,596 B2 | 4/2021 | Le et al. | |
| 2005/0207931 A1* | 9/2005 | Hesse | B22F 1/065 419/10 |
| 2011/0052927 A1* | 3/2011 | Martinoni | B33Y 70/00 528/323 |
| 2018/0022024 A1* | 1/2018 | Saito | C08G 69/26 264/482 |

FOREIGN PATENT DOCUMENTS

| | | | |
|---|---|---|---|
| CN | 101864162 A | * | 10/2010 |
| CN | 108384193 A | | 8/2018 |
| EP | 2738219 A1 | | 6/2014 |
| EP | 3325535 B1 | | 10/2020 |
| JP | 01221426 A | * | 9/1989 |
| JP | 01221426 A | | 9/1989 |
| WO | 2015124903 A1 | | 8/2015 |
| WO | 2019122143 A1 | | 6/2019 |
| WO | 2020099444 A1 | | 5/2020 |
| WO | 2020254097 A1 | | 12/2020 |
| WO | 2020254101 A1 | | 12/2020 |

OTHER PUBLICATIONS

JP011221426A English Machine translation, prepared May 19, 2023. (Year: 2023).*

(Continued)

*Primary Examiner* — Christopher M Rodd
(74) *Attorney, Agent, or Firm* — Osha Bergman Watanabe & Burton LLP

(57) ABSTRACT

The present invention generally relates to a powder comprising a PEEK-PEoEK copolymer, wherein the PEEK-PEoEK copolymer having $R_{PEEK}$ and $R_{PEoEK}$ repeat units in a molar ratio $R_{PEEK}/R_{PEoEK}$ ranging from 95/5 to 5/95. The present invention also relates to a method of preparing the powder, as well as to the uses of the powder for coating, compression molding and to prepare a three-dimensional (3D) object.

22 Claims, No Drawings

(56) References Cited

OTHER PUBLICATIONS

Schmid, "Polymer powders for selective laser sintering (SLS)", Aip Conf. Proc. 1664, 160009, p. 1-5, May 22, 2015. (Year: 2015).*
CN101864162A English Machine Translation, prepared Nov. 28, 2023. (Year: 2023).*
Ben-Haida A. et al., "Synthesis of a Catechol-Based Poly(Ether Ether Ketone)("o-PEEK") by Classical Step-Growth Polymerization and by Entropically Driven Ring-Opening Polymerization of Macrocyclic Oligomers", Aug. 16, 2006, vol. 39, No. 19, pp. 6467-6472—American Chemical Society.
Standard ASTM D3418-03, "Standard Test Method for Transition Temperatures and Enthalpies of Fusion and Crystallization of Polymers by Differential Scanning Calorimetry", 2003, p. 1-7.
Standard ASTM E794-06, "Standard Test Method for Melting and Crystallization Temperatures by Thermal Analysis", 2006, p. 1-4.

* cited by examiner

PEEK-PEoEK COPOLYMER POWDER AND METHOD OF PREPARING THE POWDER

RELATED APPLICATIONS

This application is a U.S. national stage entry under 35 U.S.C. § 371 of international patent application No. PCT/EP2020/066177 filed on Jun. 11, 2020, which claims priority to U.S. provisional patent application No. 62/869,099, filed on Jul. 1, 2019, and to European patent application No. 19192604.7 filed on Aug. 20, 2019, the whole content of each being explicitly incorporated herein by reference.

FIELD OF THE INVENTION

The present invention generally relates to a powder comprising a PEEK-PEoEK copolymer. The present invention also relates to a method of preparing the powder, as well as to the uses of the powder for coating, compression molding and to prepare a three-dimensional (3D) object. The copolymer described herein is generally such that it has $R_{PEEK}$ and $R_{PEoEK}$ repeat units in a molar ratio $R_{PEEK}/R_{PEoEK}$ ranging from 95/5 to 5/95.

BACKGROUND

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In the powder bed of the SLS printer, the powdered material is generally preheated to a processing temperature close to the melting point (Tm) of the resin. For semi-crystalline polymers, crystallization (Tc) should be inhibited during printing as long as possible, at least for several sintered layers. The processing temperature must therefore be precisely adjusted between the melting temperature (Tm) and the crystallization temperature (Tc) of the semi crystalline polymer, also called the "sintering window". The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

When the process is completed, the non-fused powder is removed from the 3D object and can be recycled and reused in a subsequent SLS process.

Producing an article by laser sintering can take a long time, more than 16 hours for certain articles or parts. This means that the powder material is submitted to high temperatures in the powder bed of the SLS printer for an extended period of time (called thermal aging). This can irreversibly affect the polymer material, in such a way that it is not recyclable anymore. Not only the chemical nature of the polymer is changed due to thermal aging, but also its mechanical properties of the polymer material such as its toughness.

Poly(aryl ether ketone) polymers (PAEK), such as poly (ether ether ketone) polymer (PEEK), are known for their high temperature performance and excellent chemical resistance.

Their uses to prepare 3D obkects/articles/parts have been described in the literature. For some semi-crystalline polymers, such as poly(ether ether ketone) (PEEK), the processing temperature is too high, causing degradation and/or crosslinking, which negatively affect SLS processability and recycling. The potential of the SLS process is therefore limited by the restricted number of materials optimised for the process.

The high temperature needed to process PEEK is also a limiting factor in certain areas such as wire coatings and mobile electronics. The high temperature can irreversibly degrade the metal surface to be coated. This is especially true for copper. Additionally, PEEK adhesion to metal is poor or insufficient for use in areas in which the polymer is in contact with metal.

PEEK-PEDEK copolymers including PEDEK units of formula: -Ph-Ph-O-Ph-C(O)-Ph-, with -Ph- being a 1,4-phenylene unit, and comprising more than 65% PEEK units of formula -Ph'-O-Ph'-C(O)-Ph'-O—, with -Ph'- being a 1,4-phenylene group, exhibit lower melting temperatures but their mechanical properties are not as good as PEEK. WO2015/124903 (Victrex) generally describe the use of such copolymers to prepare shaped articles using a powder-based additive manufacturing system (for example SLS).

PEEK-PEoEK copolymers comprising PEEK units and PEoEK units of formula —O -orthoPh-O-Ph-C(O)-Ph- (with -orthoPh- being a 1,2-phenylene unit; and -Ph- being a 1,4-phenylene unit) have been described in the art. Notably JP1221426 describes notably copolymers of PEEK and PEoEK in its examples 5 and 6, manufactured from hydroquinone, catechol and difluorobenzophenone, as allegedly possessing increased glass transition temperature, and simultaneously excellent heat resistance. Similarly, A. Ben-Haida et al. in *Macromolecules*, 2006, 39, 6467-6472 describe 50/50 and 70/30 copolymers of PEEK and PEoEK manufactured by step-growth polycondensation of hydroquinone and catechol with 4,4'-difluorobenzophenone in diphenyl sulfone. These documents however do not describe PEEK-PEoEK powders (the polymer is obtained as coarse powder with $d_{98}$>450 μm in each case) and their use for coating, compression molding or to prepare a three-dimensional (3D) object.

DETAILED DESCRIPTION

It has been now found that PEEK-PEoEK copolymers with a PEEK/PEoEK units ratio in the range from 95/5 to 5/95, preferably from 95/5 to 65/35 exhibit a good thermal stability while retaining good mechanical properties. The low melting temperature of these copolymers further allows processing at lower temperature than PEEK, which positively affects the recyclability of the powdered material, notably in the context of Additive Manufacturing.

Specifically, the present invention relates to a powder comprising a PEEK-PEoEK copolymer, wherein the copolymer has $R_{PEEK}$ and $R_{PEoEK}$ repeat units in a molar ratio $R_{PEEK}/R_{PEoEK}$ ranging from 95/5 to 5/95, preferably from 95/5 to 65/35. Also described are methods of making the PEEK-PEoEK copolymer, methods of obtaining the powder comprising a PEEK-PEoEK copolymer, as well as uses of the powder for coating, compression molding and to prepare a 3D object.

PEEK-PEoEK Copolymer

As used herein, a "PEEK-PEoEK copolymer" comprises at least 50 mol. %, collectively, of repeat units ($R_{PEEK}$) and repeat units ($R_{PEoEK}$), relative to the total number of moles of repeat units in the PEEK-PEoEK copolymer. In some embodiments, the PEEK-PEoEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEoEK}$), relative to the total number of moles of repeat units in the PEEK-PEoEK copolymer.

Repeat unit ($R_{PEEK}$) is represented by formula:

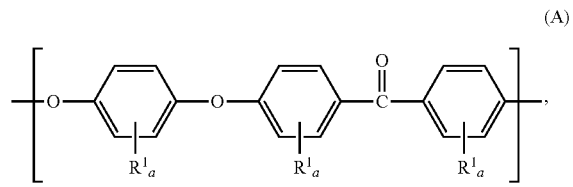

(A)

and repeat unit ($R_{PEoEK}$) is represented by formula:

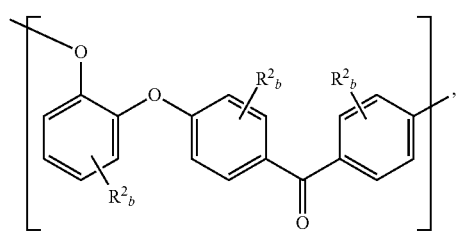

(B)

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, and the PEEK-PEoEK copolymer comprises the repeat units $R_{PEEK}$ and $R_{PEoEK}$ in a molar ratio $R_{PEEK}/R_{PEoEK}$ ranging from 95/5 to 5/95.

In some preferred embodiments, each a is zero, such that the repeat units ($R_{PEEK}$) are repeat units of formula:

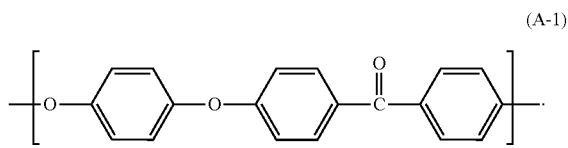

(A-1)

In some preferred embodiments, each b is zero, such that the repeat units ($R_{PEoEK}$) are repeat units of formula:

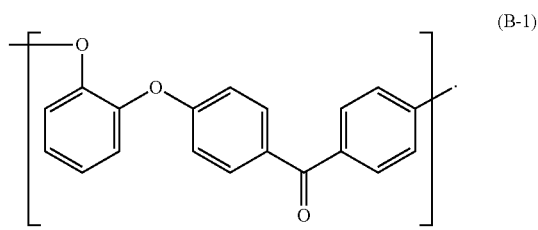

(B-1)

Preferably, repeat units ($R_{PEEK}$) are repeat units of formula (A-1), and repeat units ($R_{PEoEK}$) are repeat units of formula (B-1).

The PEEK-PEoEK copolymer of the present invention may additionally comprise repeat units ($R_{PAEK}$) different from repeat units ($R_{PEEK}$) and ($R_{PEoEK}$), as above detailed. In such case, the amount of repeat units ($R_{PAEK}$) can be comprised between 0.1 and less than 50 mol. %, preferably less than 10 mol. %, more preferably less than 5 mol. %, most preferably less than 2 mol. %, with respect to the total number of moles of repeat units of PEEK-PEoEK copolymer.

When repeat units ($R_{PAEK}$) different from repeat units ($R_{PEEK}$) and ($R_{PEoEK}$) are present in the PEEK-PEoEK copolymer of the present invention, these repeat units ($R_{PAEK}$) different from units units ($R_{PEEK}$) and ($R_{PEoEK}$), as described above, generally comply with any of the following formulae (K-A) to (K-M) herein below:

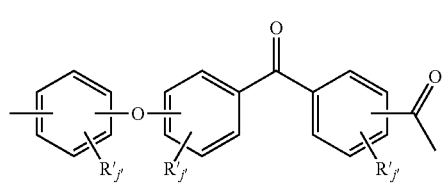

(K-A)

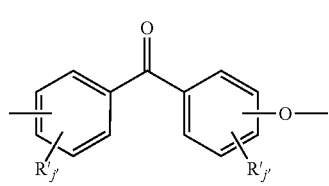

(K-B)

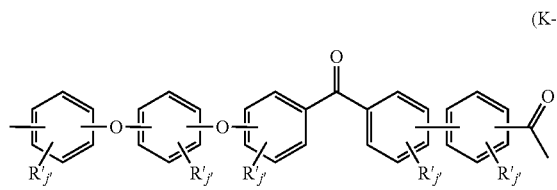

(K-C)

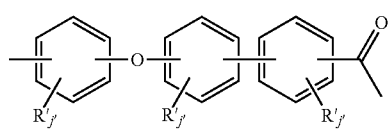

(K-D)

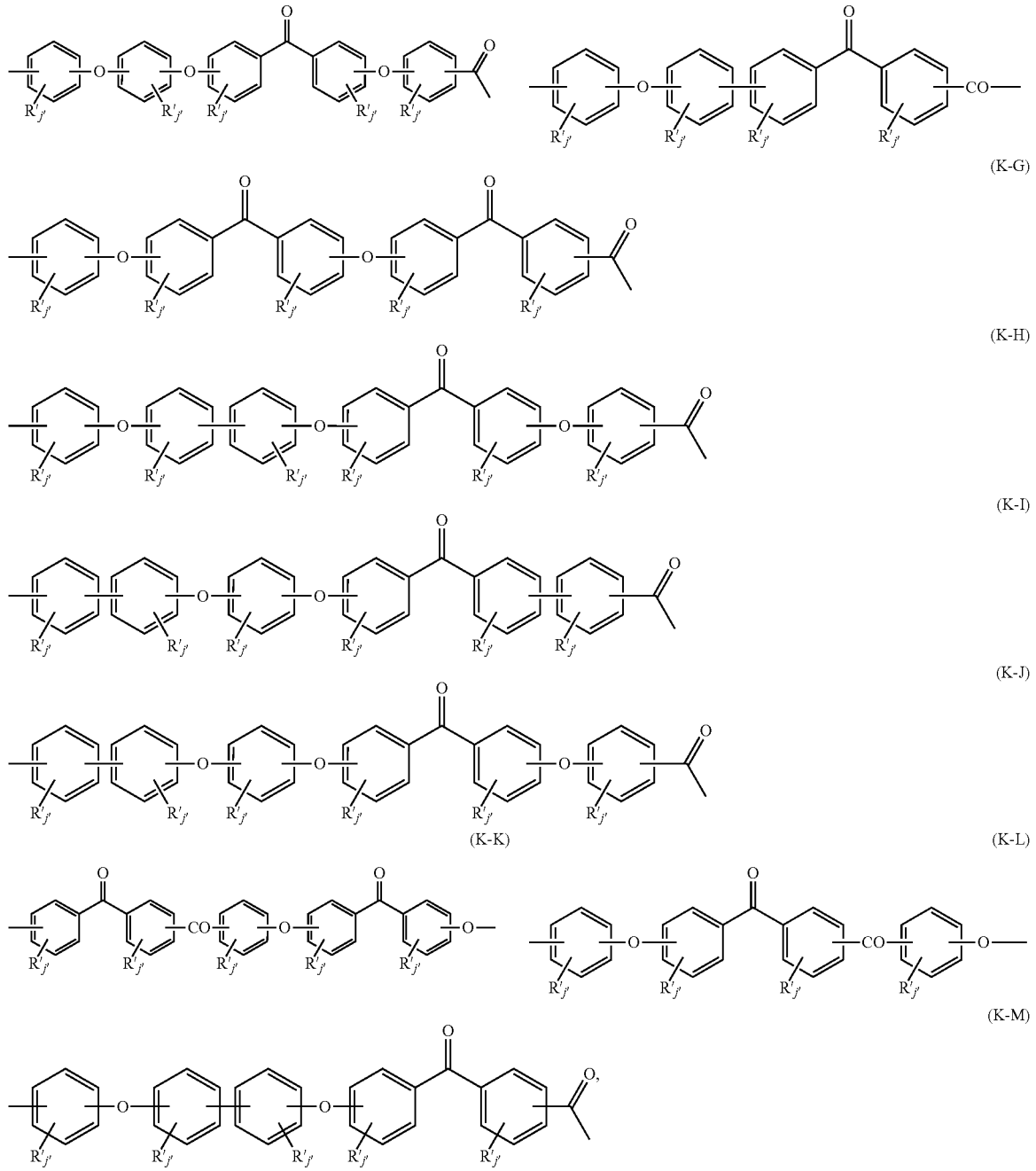

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEoEK copolymer of the present invention to be essentially composed of repeat units ($R_{PEEK}$) and ($R_{PEoEK}$), as above detailed. Thus, in some preferred embodiments, the PEEK-PEoEK copolymer consists essentially of repeat units $R_{PEEK}$ and $R_{PEoEK}$. As used herein, the expression "consists essentially of repeat units $R_{PEEK}$ and $R_{PEoEK}$" means that any additional repeat unit different from repeat units $R_{PEEK}$ and $R_{PEoEK}$, as above detailed, may be present in the PEEK-PEoEK copolymer in amount of at most 2 mol. %, at most 1 mol. % or at most 0.5 mol. %, relative to the total number of moles of repeat units in the PEEK-PEoEK copolymer, and so as not to substantially alter the advantageous properties of the PEEK-PEoEK copolymer.

Repeat units $R_{PEEK}$ and $R_{PEoEK}$ are present in the PEEK-PEoEK copolymer in a $R_{pEEK}/R_{PEoEK}$ molar ratio ranging from 95/5 to 5/95. Preferably, the PEEK-PEoEK copolymers suitable for the powder of the invention are those comprising a majority of $R_{PEEK}$ units, that-is-to-say copolymers in which the $R_{PEEK}/R_{PEoEK}$ molar ratio ranges from 95/5 to more than 50/50, even more preferably from 95/5 to 60/40, still more preferably from 90/10 to 65/35, most preferably 85/15 to 70/30.

In some embodiments, the PEEK-PEoEK copolymer has a melting temperature (Tm) of less than or equal to 340° C., preferably less than or equal to 335° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEoEK copolymer has a glass transition temperature (Tg) of at least 135° C. and at most 155° C., preferably at least 140° C., as determined on the $2^{nd}$ heat scan according to ASTM D3418-03, E1356-03, E793-06, E794-06.

In some embodiments, the PEEK-PEoEK copolymer has as heat of fusion (ΔH) of at least 1 J/g, preferably at least 2 J/g, at least 5 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEoEK copolymer may have a heat of fusion (ΔH) of at most 65 J/g, preferably at most 60 J/g.

According to certain embodiments, the PEEK-PEoEK copolymer possesses a microstructure such that its FT-IR spectrum, when recorded between 600 and 1,000 cm$^{-1}$ in ATR mode on polymer powder, is such that the following inequalities are satisfied:

$$\frac{A_{700 cm^{-1}}}{A_{704 cm^{-1}}} \leq 0.99, \quad \text{(i)}$$

wherein $A_{700\ cm^{-1}}$ is the absorbance at 700 cm$^{-1}$ and $A_{704\ cm^{-1}}$ is the absorbance at 704 cm$^{-1}$, $$\frac{A_{816 cm^{-1}}}{A_{835 cm^{-1}}} \geq 0.61, \quad \text{(ii)}$$

wherein $A_{816\ cm^{-1}}$ is the of absorbance at 816 cm$^{-1}$ and $A_{835\ cm^{-1}}$ is the absorbance at 835 cm$^{-1}$, $$\frac{A_{623 cm^{-1}}}{A_{557 cm^{-1}}} \leq 1.60, \quad \text{(iii)}$$

wherein $A_{623\ cm^{-1}}$ is the of absorbance at 623 cm$^{-1}$ and $A_{557\ cm^{-1}}$ is the absorbance at 557 cm$^{-1}$, $$\frac{A_{928 cm^{-1}}}{A_{924 cm^{-1}}} \leq 1.09, \quad \text{(iv)}$$

wherein $A_{926\ cm^{-1}}$ is the of absorbance at 928 cm$^{-1}$ and $A_{924\ cm^{-1}}$ is the absorbance at 924 cm$^{-1}$.

The PEEK-PEoEK copolymer may be such that it has a calcium content of less than 5 ppm, as measured by Inductively Coupled Plasma Optical Emission Spectrometry (ICP-OES) calibrated with standards of known calcium content. Such a particularly low and controlled Ca content is particularly beneficial when the said PEEK-PEoEK copolymer is to be used in metal junctions requiring very stringent dielectric performances. According to these preferred embodiments, the PEEK-PEoEK copolymer may have a calcium content of less than 4 ppm, less than 3 ppm or even more preferably less than 2.5 ppm.

In these preferred embodiments, the PEEK-PEoEK copolymer may also be such that it has a sodium content of less than 1,000 ppm, as measured by Inductively Coupled Plasma Optical Emission Spectrometry (ICP-OES) calibrated with standards of known sodium content. Preferably, the PEEK-PEoEK copolymer may have a sodium content of less than 900 ppm, less than 800 ppm or even more preferably less than 500 ppm.

In some embodiments, the PEEK-PEoEK copolymer may be such that it has a phosphorus content of at least 6 ppm, as measured by Inductively Coupled Plasma Optical Emission Spectrometry (ICP-OES) calibrated with standards of known phosphorus content. Preferably, the PEEK-PEoEK copolymer has a phosphorous content of at least 10 ppm, at least 15 ppm or even more preferably at least 20 ppm.

In the powder of the present invention, it may be advantageous to select PEEK-PEoEK copolymers having increased thermal stability, which may be particularly beneficial in certain fields of use, for example to prepare a 3D object by additive manufacturing. The PEEK-PEoEK copolymers may notably have peak degradation temperatures of at least 550° C., as measured TGA according to ASTM D3850, more preferably at least 551° C. and even more preferably at least 552° C.

Method of Making the PEEK-PEoEK Copolymer

Methods adapted for making PEEK-PEoEK copolymers are generally known in the art. Generally, the PEEK-PEoEK copolymer used in the polymer-metal junction of the invention is made by a method which comprises reacting at least one difluoro-compound of formula (C):

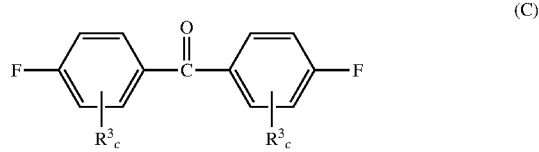

with a mixture of di-hydroxy compounds of formulas (D) and (E):

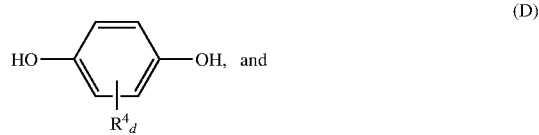

in a molar ratio (D)/(E) ranging from 95/5 to 5/95, wherein $R^3$, $R^4$, and $R^5$, have the meaning specified above, each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

In said method, a step of terminating the (poly)condensation reaction by reaction with a suitable agent may be included; agents which may be used for terminating the polycondensation reaction include compounds which terminate chain growth by being incorporated in the polymer backbone via a condensation reaction (also referred to as end-capping agents) and compounds which terminate chain growth without being incorporated in the polymer backbone through a condensation reaction (also referred to as terminating agents).

End-capping agents used in the method of making the PEEK-PEoEK copolymer notably include those represented by formula (F) below:

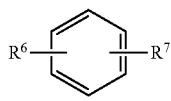

wherein
$R^6$ is F, Cl, or OH,
$R^7$ is —C(O)—Ar—$R^{10}$, —O—Ar—$R^{10}$, —$SO_2$—Ar—$R^{10}$, —Ar—$R^{10}$, an alkyl (e.g. a $C_1$-$C_{10}$ alkyl or a $C_1$-$C_5$ alkyl) or —H, with Ar being an arylene group comprising at least one benzene
ring (i.e. one benzene ring or several benzene rings), and with $R^{10}$ being F, Cl or H.

Preferably, $R^7$ is —C(O)—Ar—$R^{10}$, Ar—$R^{10}$ or H, with $R^{10}$ being F, Cl or H. According to certain preferred embodiments, $R^{10}$ is F.

Preferably, $R^6$ is F or OH. More preferably, $R^6$ is F.

When $R^7$ is different from —H, $R^6$ and $R^7$ may be 1,2- or ortho-substitution on the phenylene cycle of formula (F) or they may be 1,3- or meta-substitution on the phenylene cycle. Alternatively, $R^6$ and $R^7$ may preferably be 1,4- or para-substitution on the phenylene cycle of formula (F).

In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4'-difluorodiphenylsulfone and a mixture thereof.

Difluoro-compounds and monofunctional phenols are preferably used as end-capping agents. In some embodiments, the end-capping agent is an excess of a difluoro-compound monomer. The end-capping agent used in the method of the present invention is preferably 4,4'-difluorobenzophenone, phenol, 4-phenoxyphenol, 4-phenylphenol or a mixture thereof.

Lithium chloride is one example of a terminating agent, which will terminate the reaction without being incorporated in the polymer backbone through condensation.

In some embodiments, the reaction is terminated with at least one end-capping agent and with at least one terminating agent other than an end-capping agent. Preferably, 4,4'-difluorobenzophenone and lithium chloride are respectively used as end-capping agent and terminating agent in the method of the present invention.

In general, the (poly)condensation reaction is carried out with a slight excess of difluoro-compound of formula (C); it is further understood that, when used, the end-capping agent may be added to the reaction mixture at the inception of the polycondensation; as a whole, hence, the molar ratio [(C)+(F)]/[(D)+(E)] is ≥1.000, preferably ≥1.003, more preferably ≥1.006, even more preferably ≥1.010.

Preferably, the compound of formula (C) is 4,4'-difluorobenzophenone (DFBP). Preferably, the compound of formula (D) is hydroquinone. Preferably, the compound of formula (E) is catechol (which may be also referred to as pyrocatechol or 1,2-dihydroxybenzene). In some embodiments, the compound of formula (C) is 4,4'-difluorobenzophenone (DFBP), the compound of formula (D) is hydroquinone, and the compound of formula (E) is catechol.

The PEEK-PEoEK copolymer of the invention may be made in a solvent comprising diphenylsulfone. In some embodiments, the solvent comprises at least 50 wt. % of diphenylsulfone, based on the total weight of solvent in the reaction mixture, for example at least 60 wt. %, at least 70 wt. %, at least 80 wt. %, at least 90 wt. %, at least 95 wt. % or at least 98 wt. %, based on the total weight of solvent in the reaction mixture. In some embodiments, the solvent consists essentially in diphenylsulfone. In the method of the present invention, a solvent comprising limited amounts of impurities, as detailed in U.S. Pat. No. 9,133,111 is generally used.

The PEEK-PEoEK copolymer of the invention may be made by a method using a base, for example selected from the group consisting of potassium carbonate ($K_2CO_3$), potassium bicarbonate, sodium carbonate ($Na_2CO_3$), cesium carbonate ($Cs_2CO_3$), potassium phosphate and sodium bicarbonate. The base acts to deprotonate the components (D) and (E) during the condensation reaction. The condensation is preferably carried out in the presence potassium carbonate ($K_2CO_3$), sodium carbonate ($Na_2CO_3$) or a mixture of both, most preferably a mixture of both.

In the method of making the PEEK-PEoEK copolymer, the reaction mixture is generally polycondensed, within the temperature range, until the requisite degree of condensation is reached. The polycondensation time can be from 0.1 to 10 hours, preferably from 0.2 to 4 or from 0.5 to 3 hours, depending on the nature of the starting monomers and on the selected reaction conditions.

The solvent and the inorganic constituents, for example sodium fluoride or potassium fluoride or excess of base, can be removed by suitable methods such as dissolving and filtering, screening or extracting. This is preferably achieved through steps (a) to (d) and (e) to (g) or (e') to (g'), as below detailed, this peculiar steps sequence being material for achieving the particularly preferred microstructure/end group chemistry and purity, as particularly beneficial for certain fields of use.

According to the preferred embodiments, the PEEK-PEoEK copolymer is advantageously recovered by successively:
(a) isolating a solid phase comprising PEEK-PEoEK copolymer from the product mixture, by cooling the same at a temperature of below 120° C.;
(b) contacting the said solid phase comprising the PEEK-PEoEK copolymer with a solvent having a normal boiling point of less than 100° C. at a temperature between 15 to 100° C. and separating the residual solid from said solvent;
(c) optionally, contacting the said solid phase comprising the PEEK-PEoEK copolymer with demineralized water at a temperature between 15 to 100° C., preferably between 15 to 40° C., and separating the residual solid (1) from said demineralized water;

(d) contacting the said residual solid (1) comprising the PEEK-PEoEK copolymer with an aqueous solution of a protic acid having a pKa of at most 6, preferably at most 4, more preferably at most 3, at a temperature between 15 to 100° C., preferably between 15 to 40° C., and separating the residual solid (2) from said demineralized water; and either:

(e) contacting the said residual solid (2) comprising the PEEK-PEoEK copolymer with a solvent having a normal boiling point of less than 100° C. at a temperature between 15 to 100° C. and separating the residual solid (3) from said solvent; and (f) contacting the said residual solid (3) comprising the PEEK-PEoEK copolymer with an aqueous buffer solution having a pH comprised between 6.0 and 7.0, at a temperature between 15 to 100° C., preferably between 15 to 40° C., and separating the residual solid (4) from said aqueous buffer solution; and (g) drying the so-obtained solid residue to obtain the PEEK-PEoEK copolymer; or (e') contacting the said residual solid (2) comprising the PEEK-PEoEK copolymer with an aqueous buffer solution having a pH comprised between 6.0 and 7.0, at a temperature between 15 to 100° C., preferably between 15 to 40° C., and separating the said residual solid (3') from said aqueous buffer solution; and (f') contacting the said residual solid (3') comprising the PEEK-PEoEK copolymer with a solvent having a normal boiling point of less than 100° C. at a temperature between 15 to 100° C. and separating the residual solid (4') from said solvent; and (g') drying the so-obtained residual solid (4') to obtain the PEEK-PEoEK copolymer In particular, once a solid phase is isolated in step (a), the said phase may be first exposed to at least one of comminution, pulverizing, and triturating, so as to be provided under the form of small particles. Generally, the solid phase is ground under the form of a powder.

In step (b), the solid phase comprising the PEEK-PEoEK copolymer may be contacted with a solvent having a normal boiling point of less than 100° C.; the said solvent having a normal boiling point (i.e. a boiling point under normal pressure of 1 atm or $10^5$ Pa) of less than 100° C. is generally selected among polar organic solvents, in particular solvents possessing at least one carbonyl group and/or at least one hydroxyl group. Low boiling point ketones and alcohols are exemplary embodiment's thereof; preferred solvents used in step (b) are those selected from the group consisting of acetone, methyl ethyl ketone, ethanol, methanol, isopropanol, which may be used singly or in admixture.

In step (c), use may be made of demineralized water: methods for providing demineralized water are well-known and their choice is not critical to the extent demineralized water is used possessing an overall Na and Ca concentration of less than 20 ppm, preferably less than 10 ppm, more preferably less than 5 ppm.

In step (d), the solid residue (1) may be contacted with an aqueous solution of a protic acid having a pKa of at most 6, preferably at most 4, most preferably at most 3: the choice of the said protic acid is not particular critical, provided it complies with the mentioned pKa requirements. Hydrochloric acid, oxalic acid, phosphoric acid, acetic acid, formic acid, and mixtures thereof may be used as suitable protic acids in this step. Preferably the protic acid is at least one of hydrochloric acid, oxalic acid or phosphoric acid. It is nonetheless understood that HCl is a preferred acid to be used in this step.

Steps (e) or step (f') may be carried out by contacting with a solvent having a normal boiling point of less than 100° C.; features described above in connection with solvent used in step (b) are equally applicable for the selection of solvent used in steps (e) or (f'). Further, while different solvents may be used in step (b) and steps (e) or (f'), it may be convenient to make use of same solvent in both steps, i.e. in steps (b) and (e) or (b) and (f').

In step (f) or in step (e'), the relevant solid residue may be contacted with an aqueous solution of a protic acid having a pKa of at most 6, preferably at most 4, most preferably at most 3: the choice of the said protic acid is not particular critical, provided it complies with the mentioned pKa requirements. It is nonetheless understood that HCl is a preferred acid to be used in this step.

Steps (f) and (e') may require the use of an aqueous buffer solution, having a pH comprised between 6.0 and 7.0; while organic buffering agents may be used, it is generally preferred to make use of a phosphate-based buffering system. In the steps (f) and (e'), the PEEK-PEoEK copolymer, is preferably performed with an aqueous buffer solution of at least one of sodium dihydrogen phosphate ($NaH_2PO_4$) and disodium hydrogen phosphate ($Na_2HPO_4$). Preferably, the PEEK-PEoEK copolymer is contacted with a solution including both $NaH_2PO_4$ and $Na_2HPO_4$. The phosphate salts used of the solutions used hereby can for example be anhydrous, monohydrate, dihydrate or heptahydrate.

The concentration of the $NaH_2PO_4$ in the aqueous buffer solution is not particularly limited, but should be sufficient in order for the copolymer to preferably present a phosphorus content of more than 20 ppm. The amount of $NaH_2PO_4$ in the solution is preferably chosen to match the preferred minimal 20 ppm amount of phosphorus atoms attached to the copolymer. The concentration of $NaH_2PO_4$ in the solution is preferably at least 0.002 wt. %, more preferably at least 0.004 wt. %, most preferably at least 0.006 wt. %, most preferably at least 0.01 wt. %. The concentration of $NaH_2PO_4$ in the solution is preferably at most 0.30 wt. %, more preferably at most 0.20 wt. %, most preferably at most 0.10 wt. %, most preferably at most 0.05 wt. %. The concentration of $Na_2HPO_4$ in the solution is preferably at least 0.002 wt. %, more preferably at least 0.004 wt. %, most preferably at least 0.006 wt. %, most preferably at least 0.02 wt. %. The concentration of $Na_2HPO_4$ in the solution is preferably at most 0.30 wt. %, more preferably at most 0.20 wt. %, most preferably at most 0.10 wt. %, most preferably at most 0.05 wt. %.

In steps (f) and (e'), the PEEK-PEoEK copolymer is advantageously submitted to washing with the said aqueous buffering solution, in particular the dihydrogen phosphate ($NaH_2PO_4$) and disodium hydrogen phosphate ($Na_2HPO_4$) solution. As used herein, "washing" the copolymer with a solution including at least one of sodium dihydrogen phosphate ($NaH_2PO_4$) and disodium hydrogen phosphate ($Na_2HPO_4$) may involve substantially fixing phosphate groups on the copolymer. "Substantially fixing" means that the PEEK-PEoEK polymer preferably retains a phosphorus content of more than 20 ppm, as determined by Inductively Coupled Plasma Optical Emission Spectrometry (ICP-OES), for example more than 30 ppm, more than 40 ppm, more than 50 ppm or more than 60 ppm.

In some embodiments, the copolymer is contacted with the aqueous buffer solution for a time ranging from 5 minutes to 5 hours, preferably from 10 minutes to 3 hours. Methods of washing polymers are well known to those of skill in the art, and include, for example, slurrying the polymer with the solution including the acid or base, as defined below, and then filtering off the solution.

Step (g) or (g') comprise drying the solid residue (4)/(4'), for obtaining the PEEK-PEoEK copolymer. In this step, drying is generally carried out at a temperature of at least 95° C., for example at least 100° C., for at least one hour, for example at least 2 hours, at least 5 hours, at least 10 hours or 12 hours.

Powder

The powder of the present invention comprises at least one PEEK-PEoEK copolymer as described above. The powder of the present invention may consist essentially in one or several PEEK-PEoEK copolymers or may comprise further components, for example a flow aid/agent (F), as described below. When the powder of the invention comprises additional components, they can be added or blended with the PEEK-PEoEK copolymer of the present invention before, during or after the step of grinding.

In some embodiments of the present invention, the powder has a $d_{98}$-value less than 300 μm, as measured by laser scattering in isopropanol. According to a preferred embodiment, the powder has a $d_{98}$-value less than 280 μm, as measured by laser scattering in isopropanol, preferably less than 260 μm or less than 250 μm.

In some embodiments of the present invention, the powder has a $d_{90}$-value less than 150 μm, as measured by laser scattering in isopropanol. According to an embodiment, the powder has a $d_{90}$-value less than 120 μm, as measured by laser scattering in isopropanol, preferably less than 110 μm or less 100 μm.

In some embodiments of the present invention, the powder has a $d_{10}$-value higher than 0.1 μm, as measured by laser scattering in isopropanol. According to a preferred embodiment, the powder has a $d_{10}$-value higher than 0.2 μm, as measured by laser scattering in isopropanol, preferably higher than 0.5 μm or higher than 1 μm.

In some embodiments of the present invention, the powder has a $d_{50}$-value comprised between 40 μm and 70 μm, as measured by laser scattering in isopropanol, preferably between 40 μm and 60 μm, or between 43 82 m and 58 μm or between 45 μm and 55 μm. A powder with such particle size distribution is for example well-suited for compression molding and selective laser sintering (SLS).

In some embodiments of the present invention, the powder has a $d_{50}$-value comprised between 20 μm and 35 μm, as measured by laser scattering in isopropanol, preferably between 21 μm and 34 μm, or between 22 μm and 33 μm or between 23 μm and 32 μm. In such embodiments, the powder has preferably a $d_{90}$-value less than 80 μm, more preferably less than 70 μm. In such embodiments, the powder has preferably a $d_{98}$-value less than 150 μm, more preferably less than 110 μm. A powder with such particle size distribution is for example well-suited for powder coating, notably electrostatic powder coating.

In some embodiments of the present invention, the powder has a $d_{50}$-value comprised between 5 μm and 20 μm, as measured by laser scattering in isopropanol, preferably between 6 μm and 19 μm. In such embodiments, the powder has preferably a $d_{90}$-value less than 40 μm, more preferably less than 30 μm. In such embodiments, the powder has preferably a $d_{98}$-value less than 100 μm, more preferably less than 70 μm. A powder with such particle size distribution is for example well-suited for slurry coating.

In some embodiments of the present invention, the powder has a $d_{99}$-value less than 195 μm, as measured by laser scattering in isopropanol. According to a preferred embodiment, the powder has a $d_{99}$-value less than 190 μm, as measured by laser scattering in isopropanol, preferably less than 180 μm or less than 170 μm.

The powder of the present invention may have a BET surface area ranging from 0 to 30 $m^2/g$, preferably from 0 to 20 $m^2/g$, more preferably from 0 to 15 $m^2/g$, as measured by ISO 9277, using a soak/evacuation temperature of at most 25° C.

The powder of the present invention may has a bulk density PE (or poured bulk density) of at least 0.25, preferably at least 0.35, most preferably at least 0.40.

Method of Obtaining the PEEK-PEoEK Powder

An object of the present invention relates to a method of obtaining a powder, comprising grinding the PEEK-PEoEK copolymer at a temperature comprised between −25° C. and 150° C. inclusive, preferably between 20° C. and 80° C. inclusive. The powder may preferably has a $d_{90}$-value of less than 150 μm (as measured by laser scattering in isopropanol), and/or a $d_{50}$-value less than 70 μm.

The grinding mills used to grind the PEEK-PEoEK copolymer can be of any type, for example disk mills, jet mills, notably fluidized jet mill, impact mills, wet-grinding mills, pin mills or a combination of these equipment. A classifier may also be used.

The PEEK-PEoEK material to be ground, alone or in mixture with additional components (as described below), may be passed back through the same mill or through other serially arranged mills, possibly using a sieve or an air classifying mill, until the desired material fineness is achieved. The coarse PEEK-PEoEK powder, alone or in mixture with additional components, may therefore, for example, be passed in a single mill and a series of successive passes of the materials there through is used. Alternatively when a series of mills is used, a single pass through each mill may be employed.

The grinding process of the present invention may be continuous or semi-continuous.

According to an embodiment, the PEEK-PEoEK copolymer to be ground or milled is in the form of a so-called "coarse powder", for example a powder having a $d_{90}$-value between 500 μm and 4,000 μm, preferably between 600 μm and 2,000 μm, and/or a $d_{50}$-value between 200 μm and 2,000 μm, preferably between 300 μm and 1,000 μm. Such a coarse powder can be obtained by a polycondensation reaction and an additional step of extracting the solvent and salts after polycondensation, as well as optional post-treatment step(s) (such as tempering or heat treatment) of the polymer obtained from the polycondensation/extraction. According to this embodiment, the coarse powder is ground to produce the powder of the present invention, having preferably a $d_{90}$-value of less than 150 μm (as measured by laser scattering in isopropanol), and/or a $d_{50}$-value less than 70 μm.

According to an embodiment, the PEEK-PEoEK powder can be treated at a temperature above its Tg for a period of at least 30 minutes, preferably at a temperature of at least 170° C. for at least 5 hours.

The powder particles of the powder preferably have a spherical form or an approximately spherical form. This means that the powder particles of the powder preferably have an aspect ratio of less than 2.0. Such aspect ratio of the powder particles is more preferably of less than 1.5, and most preferably of less than 1.48. The term aspect ratio used herein means the average ratio of maximum length dimension to minimum length dimension (=maximum length/minimum length), as counted on about 60 particles from a scanning electron microscopy (SEM) image of the PEKK powder particles obtained according to the process of the invention. The dimensions of the powder particle are measured in various different directions.

Additional Components

Additional components may notably be added to the PEEK-PEoEK copolymer, before, during or after the step grinding, before the use of the powder in the end-applications. For example, the additional component may be a flow agent (F). This flow agent (F) may for example be hydrophilic. Examples of hydrophilic flow aids are inorganic pigments notably selected from the group consisting of silicas, aluminas and titanium oxide. Mention can be made of fumed silica. Fumed silicas are commercially available under the trade name Aerosil® (Evonik) and Cab-O-Sil® (Cabot). Fumed aluminas are commercially available under the trade name SpectraAl® (Cabot). According to one embodiment, the powder of the present invention comprises at least 50 wt. % of the PEEK-PEoEK copolymer, for example at least 60 wt. % of the PEEK-PEoEK copolymer, at least 70 wt. %, at least 80 wt. %, at least 90 wt. %, at least 95 wt. %, at least 98 wt. % or at least 99 wt. % of the PEEK-PEoEK copolymer described herein, based on the total weight of the powder.

In one embodiment of the present invention, the powder comprises from 0.01 to 10 wt. % of a flow agent (F), for example from 0.05 to 8 wt. %, from 0.1 to 6 wt. % or from 0.15 to 5 wt. % of at least one flow agent (F), for example of at least fumed silica or fumed alumina, based on the total weight of the powder.

These silicas or aluminas are composed of nanometric primary particles (typically between 5 and 50 nm for fumed silicas or aluminas). These primary particles are combined to form aggregates. In use as flow agent, silicas or aluminas are found in various forms (elementary particles and aggregates).

The powder of the present invention may further comprise at least another polymeric material, that-is-to-say at least one polymer or copolymer, distinct from the PEEK-PEoEK copolymer of the present invention. This additional polymeric material may for example be selected from the group consisting of poly(aryl ether sulfone) (PAES) polymers, for example a poly(biphenyl ether sulfone) (PPSU) polymer and/or a polysulfone (PSU) polymer, a poly(aryl ether ketone) (PAEK) polymers, for example a poly(ether ether ketone) (PEEK) polymer.

The powder of the present invention may also comprise one or several additives (A), such as lubricants, heat stabilizers, light stabilizers, antioxidants, pigments, processing aids, dyes, fillers, nanofillers or electromagnetic absorbers. Examples of these optional additives are titanium dioxide, zinc oxide, cerium oxide, silica or zinc sulphide, glass fibers, carbon fibers.

The powder of the present invention may also comprise flame retardants, such as halogen and halogen free flame retardants.

According to one embodiment, the powder of the present invention comprises:
at least 50 wt. % of PEEK-PEoEK copolymer,
from 0.01 wt. % to 10 wt. %, from 0.05 wt. % to 8 wt. %, from 0.1 to 6 wt. % or from 0.15 to 5 wt. % of at least one flow agent (F), and
optionally at least one additive (A), for example selected from the group consisting of fillers (such as milled carbon fibers, silica beads, talc, calcium carbonates) colorants, dyes, pigments, lubricants, plasticizers, flame retardants (such as halogen and halogen free flame retardants), nucleating agents, heat stabilizers, light stabilizers, antioxidants, processing aids, fusing agents and electromagnetic absorbers,
based on the Total Weight of the Powder Process for Manufacturing a 3D Object The present invention also relates to a process for manufacturing a 3D object, comprising depositing successive layers of the powder of the present invention and selectively sintering each layer prior to deposition of the subsequent layer, for example by means of an electromagnetic radiation of the powder.

SLS 3D printers are, for example, available from EOS Corporation under the trade name EOSINT® P.

MJF 3D printers are, for example, available from Hewlett-Packard Company under the trade name Jet Fusion.

The powder may also be used to produce continuous fiber composites in a CBAM process, for example as developed by Impossible Objects.

The process for manufacturing a 3D object usually takes place in a printer. The printer may comprise a sintering chamber and a powder bed, both maintained at a specific temperature.

According to an embodiment, the step of sintering comprises selective sintering by means of a high power energy source, for example a high power laser source such as an electromagnetic beam source.

The powder to be printed can be pre-heated to a processing temperature (Tp), above the glass transition (Tg) temperature of the powder (e.g. polymer). The processing temperature of the printer is the temperature at which is heated the material (M) prior to the sintering, for example in the powder bed of a SLS printer. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

The process for manufacturing a 3D object of the present invention employs a powder comprising at least one PEEK-PEoEK copolymer. The powder may comprise recycled powder, that-is-to say a material which has already been exposed to the processing temperature of a 3D printer. In some embodiments, the powder comprises at least 10 wt. % of recycled powder, based on the total weight of the powder, at least 20 wt. %, at least 30 wt. %, at least 40 wt. %, at least 50 wt. %, at least 60 wt. %, at least 70 wt. %, at least 80 wt. %, at least 90 wt. %, at least 95 wt. % or at least 98 wt. %. In some embodiments, the powdered polymer material (M) comprises a ratio of recycled powder/unrecycled powder ranging from 50/50 to 100/0, preferably 55/45 to 100/1, more preferably 60/40 to 100/1. As demonstrated below, the powder described herein, comprising the PEEK-PEoEK copolymer of the present invention, is not significantly affected by the long-term exposure to the processing temperature.

The combination of the material and the choice of a specific processing temperature (Tp), based on the material composition, makes possible the recycling of the unsintered material and its reuse in the manufacture of a new 3D object. The powder is not significantly affected by the long-term exposure to the processing temperature and presents a set of characteristics (namely powder aspect and color, disaggregation and coalescence abilities) which is comparable to a new, unprocessed polymer material. This makes the used powder completely suitable for reuse in a laser sintering 3D printing process, without impacting the appearance and mechanical performances of the resulting printed article (notably the expected performance of the polymer materials).

In some preferred embodiments, the recycled powder has a $\Delta MFI \leq 40\%$, preferably 38%, more preferably $\leq 35\%$ wherein:

$$\Delta MFI = 100(MFI_{t0} - MFI_{t1})/MFI_{t0}$$

wherein:
MFI is the Melt Flow Index as measured by ASTM D1238 at 340° C. with a 8.4 kg weight,
$MFI_{t0}$ is the MFI before a 24-hour exposure to a temperature of 290° C. under air,
$MFI_{t1}$ is the MFI after a 24-hour exposure to a temperature of 290° C. under air.

In some other preferred embodiments, the recycled powder has a ΔTm≤4° C., wherein:

$$\Delta Tm = Tm_{t1} - Tm_{t0}$$

Wherein:
Tm is the melting temperature on the $1^{st}$ heat scan in DSC according to ASTM D3418-03, E1356-03, E793-06, E794-06
$Tm_{t0}$ is the Tm before a 24-hour exposure to a temperature of 290° C. under air,
$Tm_{t1}$ is the Tm after a 24-hour exposure to a temperature of 290° C. under air.

In some embodiments, the process for manufacturing a 3D object of the present invention additionally comprises steps a1) to a4) below:
a1) heating the powder preferably a temperature Tp as follows:

$$Tp < Tm - 5,$$

more preferably Tp<Tm−10,
even more preferably Tp<Tm−15,
wherein Tm (° C.) is the melting temperature of the PEEK-PEoEK copolymer, as measured on the 1st heat scan by differential scanning calorimetry (DSC) according to ASTM D3418,
a2) depositing successive layers of the heated powder,
a3) selectively sintering each layer prior to deposition of the subsequent layer, and
a4) removing heated, non-fused powdered material of step a1) and recycling it in a subsequent printing cycle.

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

According to the present invention, the powder is not significantly affected by the long-term exposure to the processing temperature and presents a set of characteristics which is comparable to a new, unprocessed polymer material. This makes the used powder completely suitable for reuse in a laser sintering 3D printing process, without impacting the appearance and mechanical performances of the resulting printed article (notably the expected performance of the polymer materials).

3D Objects and Articles

The present invention also relates to a 3D object/article/part, obtainable by laser sintering from the powder of the present invention.

The present invention also relates to a 3D object/article/part, comprising the powder of the present invention.

The present invention also relates to the use of the powder of the present invention for the manufacture of a 3D object using additive manufacturing, preferably SLS, CBAM or JMF.

The present invention also relates to the use of a PEEK-PEoEK copolymer, for the manufacture of a powder for additive manufacturing, preferably SLS, CBAM or JMF.

The 3D objects/articles/parts obtainable by such method of manufacture can be used in a variety of final applications. Mention can be made in particular of medical devices, brackets and complex shaped parts in the aerospace industry and under-the-hood parts in the automotive industry (e.g. thermostat housing, water pump impeller, engine covers, pump casing).

Exemplary embodiments will now be described in the following non-limiting examples.

EXAMPLES

Raw Materials
Hydroquinone, photo grade, was procured from Eastman, USA. It contained 0.38 wt % moisture, which amount was used to adapt the charge weights. All weights indicated include moisture.
Pyrocatechol, flakes, was procured from Solvay USA. Its purity was 99.85% by GC. It contained 680 ppm moisture, which amount was used to adapt the charge weights. All weights indicated include moisture.
Resorcinol, ACS reagent grade, was procured from Aldrich, USA
4,4'-Biphenol, polymer grade, was procured from SI, USA.
4,4'-Difluorobenzophenone, polymer grade (99.8%+), was procured from Malwa, India
Diphenyl sulfone (DPS), polymer grade, was procured from Proviron (99.8% pure).
Sodium carbonate, light soda ash, was procured from Solvay S. A., France.
Potassium carbonate with a $d_{90}$<45 μm was procured from Armand products.
Lithium chloride (LiCl), anhydrous grade, was procured from Acros.
1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).
1,4-bis(4'-hydroxybenzoyl)benzene (1,4-BHBB) and 1,3-bis (4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Methods
Determination of the melting temperature (Tm), glass transition temperature (Tg) and heat of fusion (ΔH)
Unless otherwise noted, the melting temperature Tm was determined as the peak temperature of the melting endotherm on the $2^{nd}$ heat scan in differential scanning calorimeter (DSC) according to ASTM D3418-03, E1356-03, E793-

06, E794-06. In some cases (always noted), the melting point is recorded on the 1$^{st}$ heat scan using the same method, to characterize powders melting behavior. Details of the procedure as used in this invention are as follows: a TA Instruments DSC Q20 was used with nitrogen as carrier gas (99.998% purity, 50 mL/min).
Temperature and heat flow calibrations were done using indium. Sample size was 4 to 7 mg. The weight was recorded ±0.01 mg. The heat cycles were:
- 1st heat cycle: 30.00° C. to 400.00° C. at 20.00° C./min, isothermal at 400.00° C. for 1 min;
- 1st cool cycle: 400.00° C. to 30.00° C. at 20.00° C./min, isothermal for 1 min;
- 2nd heat cycle: 30.00° C. to 400.00° C. at 20.00° C./min, isothermal at 400.00° C. for 1 min.

The melting temperature Tm was determined as the peak temperature of the melting endotherm on the 2nd heat scan. The enthalpy of fusion was determined on the 2nd heat scan. The melting of the composition was taken as the area over a linear baseline drawn from 220° C. to a temperature above the last endotherm.

The glass transition temperature Tg (mid-point) was determined on the 2$^{nd}$ heat scan according to ASTM D3418-03, E1356-03, E793-06, E794-06.

The crystallization temperature Tc was determined as the peak temperature of the crystallization exotherm on the 1$^{st}$ cool scan.

Determination of the Melt Viscosity (MV)

The melt viscosity was measured using a capillary rheometer according to ASTM D3835. Readings were taken at 410° C. and a shear rate of 46.3 s—1 using a die with the following characteristics: diameter=1.016 mm, length=20.32 mm, cone angle=120°.

Determination of Melt Flow Index (MFI)

The melt flow index was determined according to ASTM D1238 at 340° C. with a 3.8 kg weight. The final MFI for a 8.4 kg weight was obtained by multiplying the value obtained by 2.35.

Determination of Tensile Properties by Compression Molding

A 762 mm×762 mm×3.2 mm plaque was prepared from the polymer by compression molding of 30 g of polymer under the following conditions:
- preheat at $T_1$,
- $T_1$/20 minutes, 2000 kg-f
- $T_1$/2 minutes, 2700 kg-f
- cool down to 30° C. over 40 minutes, 2000 kg-f $T_1$ values used for the polymers are indicated in the results table.

The plaques were then annealed at 200° C. for 3 hours.

The 762 mm×762×3.2 mm compression molded plaques were machined into Type V ASTM tensile specimens and these specimens of the various polymer compositions were subjected to tensile testing according to ASTM method D638 at 1.27 mm/minute (or 0.05 inch/minute) room temperature (i.e. 23° C.) on 3 specimens. The average of the 3 specimens is presented.

Determination of Tensile Properties By Printing

Printing occurred on an EOSINT® P800 SLS Printer, using the following print settings: hatch laser power of 16 watts, contour laser power of 8.5 watts, laser speed of 2.65 m/s, and cooling rate after print completion of less than 10° C./min.

Printed Type I ASTM tensile specimens were subjected to tensile testing according to ASTM method D638 at 5.08 mm/minute (or 0.2 inch/minute) room temperature (i.e. 23° C.) on 5 specimens. The average of the 5 specimens is presented.

Determination of Particle Size Distribution ($d_{99}$, $d_{98}$, $d_{90}$, $d_{50}$, $d_{10}$)

The PSD (volume distribution) was determined by an average of 3 runs using laser scattering Microtrac S3500 analyzer in wet mode (128 channels, between 0.0215 and 1408 μm). The solvent was isopropanol with a refractive index of 1.38 and the particles were assumed to have a refractive index of 1.59. The ultrasonic mode was enabled (25 W/60 seconds) and the flow was set at 55%.

Synthesis Examples

PEKK (58/42 TA Ratio)

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.051 g of 1,4-DFDK. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 270° C. At 270° C., 13.725 g of $Na_2CO_3$ and 0.086 g of $K_2CO_3$ was added via a powder dispenser to the reaction mixture over 60 minutes. At the end of the addition, the reaction mixture was heated to 320° C. at 1° C./minute. After 2 minutes at 320° C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.503 g of 1,4-DFDK were added to the reactor and the reaction mixture was kept at temperature for 15 minutes. Another charge of 25 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

The properties of the polymer are disclosed in Table 3 below.

PEKK (60/40 T/I Ratio)

The same procedure as PEKK (58/42 T/I ratio) was followed but with the reagents amounts as listed in Table 1. The carbonates were added at 200° C. instead of 270° C.

TABLE 1

| Reagent | Units | |
| --- | --- | --- |
| T/I | | 60/40 |
| Diphenyl sulfone | g | 112.50 |
| 1,3-BHBB | g | 31.800 |
| 1,4-BHBB | g | 7.950 |
| 1,4-DFDK | g | 40.810 |
| $Na_2CO_3$ | g | 13.725 |
| $K_2CO_3$ | g | 0.086 |
| Time at 320° C. | minutes | 180 |
| 1,4-DFDK in first termination | g | 0.805 |
| Lithium chloride in second termination | g | 0.529 |
| 1,4-DFDK in third termination | g | 0.402 |
| Polymer weight | g | 70 |

The properties of the polymer are disclosed in Table 3 below.

PEEK-PEDEK Copolymer (75/25)

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.158 g of hydroquinone, 11.322 g of 4,4'-biphenol and 53.520 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.744 g of $Na_2CO_3$ and 0.168 g of $K_2CO_3$ was added via a powder dispenser to the reaction mixture over 30 minutes. At the end of the addition, the reaction mixture was heated to 320° C. at 1° C./minute. After 16 minutes at 320° C., 3.713 g of 4,4'-difluorobenzophenone were added to the reaction mixture while keeping a nitrogen purge on the reactor. After 5 minutes, 1.031 g of lithium chloride were added to the reaction mixture. 10 minutes later, another 2.122 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat unit of the polymer is:

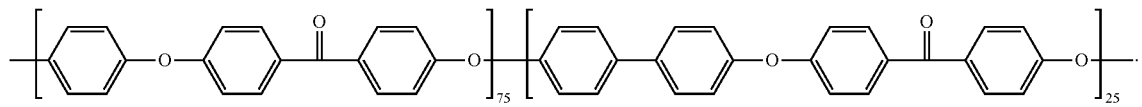

The melt viscosity measured by capillary rheology at 410° C., 46 $s^{-1}$ was 0.28 $kN-s/m^2$.

The properties of the polymer are disclosed in Table 3 below.

PEEK-PEmEK Copolymer (75/25)

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 338.33 g of diphenyl sulfone, 41.665 g of hydroquinone, 13.863 g of resorcinol and 112.593 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 55.482 g of $Na_2CO_3$ and 0.174 g of $K_2CO_3$ was added via a powder dispenser to the reaction mixture over 30 minutes. At the end of the addition, the reaction mixture was heated to 300° C. at 1° C./minute. After 36 minutes at 300° C., 13.169 g of 4,4'-difluorobenzophenone were added to the reaction mixture while keeping a nitrogen purge on the reactor. After 5 minutes, 2.132 g of lithium chloride were added to the reaction mixture. 10 minutes later, another 4.390 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 165 g of a light brown powder.

The repeat unit of the polymer is:

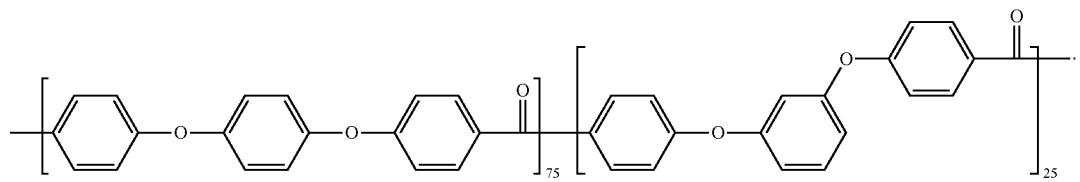

The properties of the polymer are disclosed in Table 3 below.

PEEK-PEoEK Copolymer (80/20)

In a 1000 mL 4-neck reaction flask fitted with a stirrer, a N₂ inlet tube, a Claisen adapter with a thermocouple plunging in the reaction medium, and a Dean-Stark trap with a condenser and a dry ice trap were introduced 343.63 g of diphenyl sulfone, 61.852 g of hydroquinone, 15.426 g of pyrocatechol and 154.573 g of 4,4'-difluorobenzophenone. The flask content was evacuated under vacuum and then filled with high purity nitrogen (containing less than 10 ppm O₂). The reaction mixture was then placed under a constant nitrogen purge (60 mL/min).

The reaction mixture was heated slowly to 150° C. At 150° C., a mixture of 76.938 g of Na₂CO₃ and 0.484 g of K₂CO₃ was added via a powder dispenser to the reaction mixture over 30 minutes. At the end of the addition, the reaction mixture was heated to 320° C. at 1° C./minute. After 24 minutes at 320° C., the reaction was terminated in 3 stages: 18.329 g of 4,4'-difluorobenzophenone were added to the reaction mixture while keeping a nitrogen purge on the reactor. After 5 minutes, 2.388 g of lithium chloride were added to the reaction mixture. 10 minutes later, another 6.110 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture by extracting successively with acetone and water at room temperature. The powder was then dried at 120° C. under vacuum for 12 hours yielding 179 g of a white powder.

The repeat unit of the polymer is:

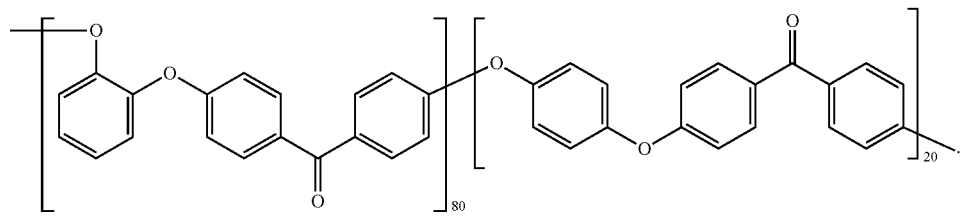

The properties of the polymer are disclosed in Table 3 below.

PEEK-PEoEK Copolymer (75/25)

The same procedure as PEEK-PEoEK (80/20) was followed but with the reagents amounts listed in Table 2.

TABLE 2

| Reagent | Units | |
|---|---|---|
| PEEK/PEoEK | | 75/25 |
| Diphenyl sulfone | g | 343.63 |
| Hydroquinone | g | 57.989 |
| pyrocatechol | g | 19.271 |
| 4,4'-difluorobenzophenone | g | 154.483 |
| Na₂CO₃ | g | 76.893 |
| K₂CO₃ | g | 0.483 |
| Time at 320° C. | minutes | 37 |
| 4,4'-difluorobenzophenone in first termination | g | 10.686 |
| Lithium chloride in second termination | g | 2.966 |
| 4,4'-difluorobenzophenone in third termination | g | 6.106 |
| Polymer weight | g | 188 |

The properties of the polymers are disclosed in Table 3 below.

TABLE 3

| Property | Units | PEKK (58/42) | PEKK (60/40) | PEEK-PEDEK (75/25) | PEEK-PEmEK (75/25) | PEEK-PEoEK (75/25) | PEEK-PEoEK (80/20) |
|---|---|---|---|---|---|---|---|
| MV (410° C., 46 s⁻¹) | kN-s/m² | 0.58 | 0.59 | 0.80 | 2.11 | 0.62 | 0.52 |
| Tg | ° C. | 160 | 160 | 155 | 140 | 143 | 144 |
| Tm | ° C. | 301 | 310 | 306 | 304 | 290 | 301 |
| Tc | ° C. | 208 | 214 | 252 | 233 | 199 | 193 |
| Heat fusion | j/g | 8 | 5 | 31 | 38 | 18 | 7 |
| T₁ molding | ° C. | N/A | 343 | 343 | 343 | 343 | 368 |

TABLE 3-continued

| Property | Units | PEKK (58/42) | PEKK (60/40) | PEEK-PEDEK (75/25) | PEEK-PEmEK (75/25) | PEEK-PEoEK (75/25) | PEEK-PEoEK (80/20) |
|---|---|---|---|---|---|---|---|
| Ultimate[a] Tensile strength by CM[b] | psi | N/A | 14200 | 13100 | 15000 | 13700 | 14100 |
| Tensile modulus by CM | ksi | N/A | 532 | 468 | 611 | 562 | 567 |

[a]larger value of at yield and at break;
[b]compression molded samples

PEEK-PEoEK has Improved Mechanical Properties over PEEK-PEDEK.

Preparation of Fine Powders by Grinding for Compression Molding 1 kg of each of the PEKK and PEoEK polymer materials were prepared according to the synthesis methods described above and were slowly fed to the feed port of a Retsch® SR200 rotor mill, fitted with a 0.5 mm opening Conidur screen mounted in the reverse flow position and standard 6-blade rotor with a speed of 10,000 rpm. The feed rate was adjusted so that the outlet pipe of the grinder was cold to the touch (T max 30-40° C.). The materials were re-fed to the Retsch SR200 with a 0.25 mmm then through a 0.08 mm screen, also in the reverse flow position with a standard 6-blade rotor at 10,000 rpm.

Once all the materials had been ground through the 0.08 mm grinding screen, they were sieved through a 106 μm screen and the particle size distribution was measured. The details of the grinding results are presented in Table 4 below.

TABLE 4

| Example | CE1 | E2 |
|---|---|---|
| Nature of polymer | PEKK (58/42) | PEEK-PEoEK (80/20) |
| Yield after grinding and sieving (%) | 61 | 91 |
| $d_{10}$ after sieving (μm) | 31 | 21 |
| $d_{50}$ after sieving (μm) | 61 | 50 |
| $d_{90}$ after sieving (μm) | 113 | 97 |
| $d_{98}$ after sieving (μm) | 190 | 170 |
| $d_{99}$ after sieving (μm) | 227 | 202 |

The data indicates that PEKK is difficult to grind (low yield) and that a $d_{50}$ of 50 μm typically desired for SLS applications is difficult to reach. The PEEK-PEoEK copolymer can be ground in an economical way into a powder matching the particle size requirement for SLS and compression molding ($d_{50}$=50 μm, $d_{90}$<110 μm).

Heat Aging of Powder 1 kg of each of the four different polymeric material described in Table 5 below were prepared according to the synthesis methods described above and ground using a Restch® Ultracentrifugal mill ZM200 grinder using a 0.5 mm screen, to ensure homogeneous particle size for the exposure testing.

For each sample, 50 g of ground powder were weighed up in aluminium loaf pans and the pans placed in an oven under air at 290° C., with fan for 24 hours. This aging test was aimed at evaluating the stability of the powder upon recycling in an SLS process where the powder is kept at temperature close to its melting point under concentrations of oxygen around 0.5-2.0%. The melt flow and thermal transitions properties were measured on the samples before and after aging as a way to monitor polymer degradation. The results are detailed in Table 5.

TABLE 5

| | Polymer | MFI before aging (g/10 min) | MFI after aging (g/10 min) | ΔMFI upon aging | Tm 1st heat before aging (° C.) | Tm 1st heat after aging (° C.) |
|---|---|---|---|---|---|---|
| CE3 | PEKK (58/42) | 27 | 16 | −41 | 300 | 304 |
| CE4 | PEEK-PEDEK (75/25) | 31 | 16 | −49 | 299 | 308 |
| CE5 | PEEK-PEmEK (75/25) | 8 | 0 | −100 | 302 | 307 |
| E6 | PEEK-PEoEK (80/20) | 38 | 26 | −30 | 304 | 308 |

The data indicates that the PEEK-PEoEK copolymer powder according to the invention is more stable at 290° C. under air than the material of the comparative examples CE3, CE4 and CE5:

The MFI change for E6 is less than 40%, while the comparative materials were found to a change of more than 40% in melt flow.

The increase in Tm in the first heat is +4° C., which is less than the increase for CE4 and CE5.

This data indicates that the PEEK-PEoEK copolymer of the invention exhibits an improved stability over other low Tm polyketones, which is important to ensure good recyclability in SLS.

Preparation of Fine Powder By Grinding For Printing 5 kg of each of the PEKK and PEEK-PEoEK polymer materials as described in Table 6 below were prepared according to the synthesis methods described above and slowly fed to the feed port of a Retsch® SR200 rotor mill, fitted with a 0.5 mm opening Conidur screen mounted in the reverse flow position and standard 6-blade rotor with a speed of 10,000 rpm. The feed rate was adjusted so that the outlet pipe of the grinder was cold to the touch (T max 30-40° C.). The materials were re-fed to the Retsch SR200 with a 0.25 mmm then through a 0.08 mm screen, also in the reverse flow position with a standard 6-blade rotor at 10,000 rpm.

Once all the materials had been ground through the 0.08 mm grinding screen, they were sieved through No. 120 mesh tensile bolting cloth (pore size of 147 μm) and the particle size distribution was measured. The details of the grinding results are presented in Table 6.

TABLE 6

| Example | CE7 | E8 |
|---|---|---|
| Nature of polymer | PEKK (60/40) | PEEK-PEoEK (75/25) |

TABLE 6-continued

| Example | CE7 | E8 |
| --- | --- | --- |
| $d_{10}$ after sieving (μm) | N/A | 24 |
| $d_{50}$ after sieving (μm) | 57 | 56 |
| $d_{90}$ after sieving (μm) | 88 | 106 |
| $d_{99}$ after sieving (μm) | 152 | 208 |

Printing Results

The PEKK and PEEK-PEoEK polymer materials (as described in Table 7 below) were printed according to the disclosed printing conditions. The mechanical properties of the resultant tensile bars are disclosed in Table 7. Fresh powder of the polymer materials and the resultant unsintered loose powder in the powder bed after printing that was not sintered into objects were measured for melt flow.

TABLE 7

| Property | Units | CE7 PEKK (60/40) | E8 PEEK-PEoEK (75/25) |
| --- | --- | --- | --- |
| Processing temperature (Tp) | °C. | 293 | 263 |
| Print duration | min | 290 | 390 |
| Ultimate[a] Tensile strength by printing | psi | 10500 | 10900 |
| Tensile modulus by printing | ksi | 536 | 513 |
| MFI of unsintered powder before printing | g/10 min | 32 | 38 |
| MFI of unsintered powder after printing | g/10 min | 23 | 38 |
| ΔMFI of unsintered powder | % | −28 | 0 |

[a]larger value of at yield and at break

The data in Table 7 indicates that the PEEK-PEoEK copolymer powder according to the invention (E8) is more stable at relative printing conditions than the materials of the comparative example CE7:

The MFI change for E8 is 0%, while the comparative material of CE7 was found to have a change of -28% in melt flow.

The mechanical properties of E8 are comparable to that of the materials of comparative example CE7.

The differences in processing temperature between the example E8 and comparative example CE7 is due to the relative difference in melting temperatures of the materials. Considering that the print duration of example E8 is longer than that of comparative example CE7 (390 min vs. 290 min), the fact that the MFI change for E8 is still 0% is surprising. The PEEK-PEoEK copolymer of the invention exhibits an improved stability over PEKK, which is also a low Tm polyketone. This is an important property of the copolymer of the present invention to ensure good recyclability in SLS.

Should the disclosure of any patents, patent applications, and publications which are incorporated herein by reference conflict with the description of the present application to the extent that it may render a term unclear, the present description shall take precedence.

The invention claimed is:

1. A powder comprising a PEEK-PEoEK copolymer, wherein the copolymer comprises at least 50 mol. %, collectively, of repeat units ($R_{PEEK}$) and repeat units ($R_{PEoEK}$), relative to the number of repeat units in the PEEK-PEoEK copolymer, wherein:

(a) repeat units ($R_{PEEK}$) are repeat units of formula:

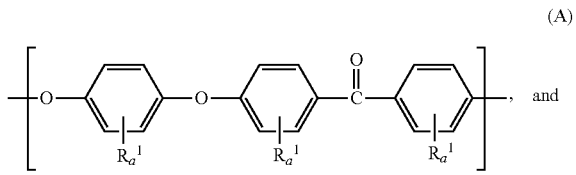

(A)

and (b) repeat units ($R_{PEoEK}$) are repeat units of formula (B):

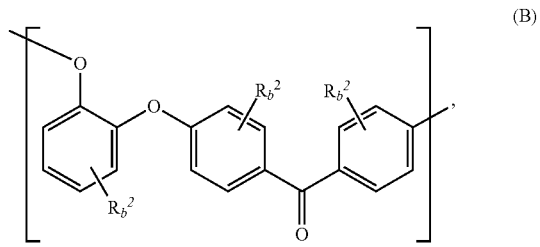

(B)

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, the PEEK-PEoEK copolymer comprises the repeat units $R_{PEEK}$ and $R_{PEoEK}$ in a molar ratio $R_{PEEK}/R_{PEoEK}$ ranging from 95/5 to 5/95, wherein the powder has a $d_{98}$-value of less than 300 μm, as measured by laser scattering in isopropanol, and wherein the PEEK-PEoEK copolymer has a phosphorous content of at least 6 ppm, as measured by Inductively Coupled Plasma Optical Emission Spectrometry (ICP-OES) calibrated with standards of known phosphorous content.

2. The powder of claim 1, wherein the repeat units ($R_{PEEK}$) are repeat units of formula:

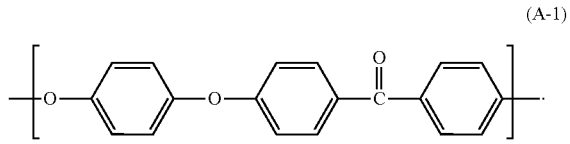

(A-1)

3. The powder of claim 1, wherein the repeat units ($R_{PEoEK}$) are repeat units of formula:

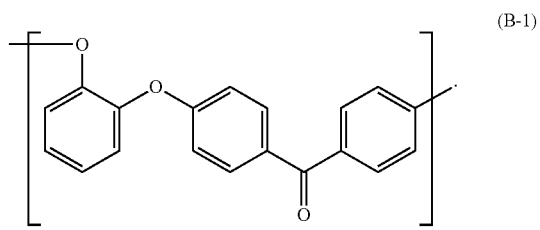

(B-1)

4. The powder of claim 1, wherein the PEEK-PEoEK copolymer consists essentially of repeat units ($R_{PEEK}$) and ($R_{PEoEK}$), wherein any additional repeat unit different from repeat units ($R_{PEEK}$) and ($R_{PEoEK}$), are either absent or may be present in amount of at most 2 mol. %, relative to the total number of moles of repeat units in the PEEK-PEoEK copolymer.

5. The powder of claim 1, wherein repeat units $R_{PEEK}$ and $R_{PEoEK}$ are present in the PEEK-PEoEK copolymer in a $R_{PEEK}/R_{PEoEK}$ molar ratio ranging from 50/50 to 95/5.

6. The powder of claim 1, wherein:
the PEEK-PEoEK copolymer has a melting temperature (Tm) of less than or equal to 340° C., wherein the melting temperature (Tm) is measured as the peak temperature of the melting endotherm on the second heat scan in a differential scanning calorimeter (DSC) according to ASTM D3418-03 and E794-06, and using heating and cooling rates of 20° C./min; and/or
the PEEK-PEoEK copolymer has as heat of fusion (ΔH) of at least 1 J/g, wherein the heat of fusion is determined as the area under the melting endotherm on the second heat scan in a differential scanning calorimeter (DSC) according to ASTM D3418-03 and E794-06, and using heating and cooling rates of 20° C./min.

7. The powder of claim 1, further comprising:
at least one flow agent (F), and/or
at least one additive (A) selected from the group consisting of lubricants, heat stabilizers, light stabilizers, antioxidants, pigments, processing aids, dyes, fillers, nanofillers or electromagnetic absorbers and flame retardants.

8. The powder of claim 1, comprising at least 50 wt. % of PEEK-PEOEK copolymer, based on the total weight of the powder.

9. The powder of claim 1, wherein the powder has a $d_{90}$-value of less than 150 μm, as measured by laser scattering in isopropanol.

10. The powder of claim 1, wherein the powder has a $d_{50}$-value ranging from 40 to 70 μm, as measured by laser scattering in isopropanol.

11. The powder of claim 1, wherein the powder has a $d_{50}$-value ranging from 20 to 35 μm, as measured by laser scattering in isopropanol.

12. The powder of claim 1, wherein the powder has a $d_{50}$-value ranging from 5 to 20 μm, as measured by laser scattering in isopropanol.

13. A method of obtaining the powder of claim 1, the method comprising a step of grinding the PEEK-PEoEK copolymer at a temperature comprised between −25° C. and 150° C.

14. A process for manufacturing a three-dimensional object, the process comprising:
a) depositing successive layers of the powder of claim 1, and
b) selectively sintering each layer prior to deposition of the subsequent layer.

15. A method for coating or compression molding, the method comprising coating or compression molding the powder according to claim 1.

16. The powder of claim 1, wherein the PEEK-PEoEK copolymer comprises at least 95 mol. %, collectively, of repeat units ($R_{PEEK}$) and repeat units ($R_{PEoEK}$).

17. The powder of claim 1, wherein repeat units $R_{PEEK}$ and $R_{PEoEK}$ are present in the PEEK-PEoEK copolymer in a $R_{PEEK}/R_{PEoEK}$ molar ratio ranging from 85/15 to 70/30.

18. The powder of claim 1, wherein the powder has a bulk density of at least 0.25.

19. The powder of claim 1, wherein the powder has a $d_{10}$-value of higher than 1 μm, as measured by laser scattering in isopropanol.

20. The powder of claim 1, wherein the PEEK-PEoEK copolymer has a phosphorous content of at least 10 ppm, as measured by Inductively Coupled Plasma Optical Emission Spectrometry (ICP-OES) calibrated with standards of known phosphorous content.

21. The powder of claim 1, wherein the PEEK-PEoEK copolymer has a phosphorous content of at least 15 ppm, as measured by Inductively Coupled Plasma Optical Emission Spectrometry (ICP-OES) calibrated with standards of known phosphorous content.

22. The powder of claim 1, wherein the PEEK-PEoEK copolymer has a phosphorous content of at least 20 ppm, as measured by Inductively Coupled Plasma Optical Emission Spectrometry (ICP-OES) calibrated with standards of known phosphorous content.

* * * * *